INVENTORS
JAMES F. SAUER
LEONARD S. BURNS

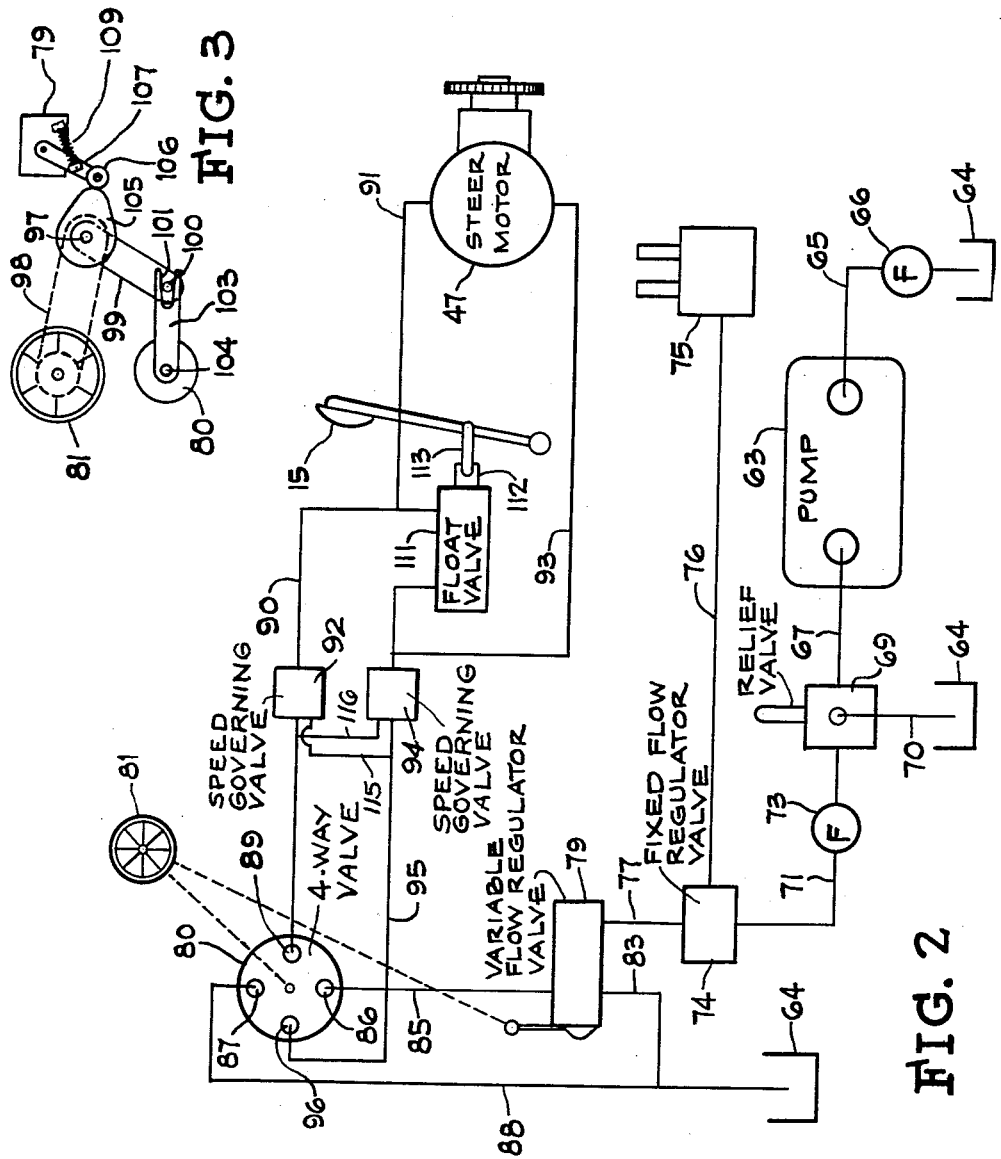

United States Patent Office 3,015,971
Patented Jan. 9, 1962

3,015,971
CONTROL CIRCUIT FOR HYDRAULIC POWER STEERING SKID STEER SYSTEMS
James F. Sauer and Leonard S. Burns, Aurora, Ill., assignors to Barber-Greene Company, Aurora, Ill., a corporation of Illinois
Filed Oct. 20, 1959, Ser. No. 847,642
11 Claims. (Cl. 74—720.5)

This invention relates to improvements in power steering systems and more particularly relates to an improved form of hydraulically controlled power steering system, particularly adapted to steer skid-steer vehicles, such as asphalt paver finishers or the like.

A principal object of the invention is to provide a hydraulically actuated and controlled skid-steer power steering system arranged with a view toward simplicity in operation and control, and uniformity in steering in the desired direction.

A further object of the invention is to provide an improved form of skid-steer power steering system having a simple and efficient hydraulic system for effecting uniformity and fineness in steering control, in which the steering control is correlated with the drive to the vehicle and is rendered ineffective when the drive to the vehicle is disconnected from its source of power.

A still further object of the invention is to provide a hydraulically controlled power steering system particularly adapted for paver finishers and the like, in which steering is effected by varying the driving speeds of the traction devices in reverse orders and the traction devices are automatically locked to rotate at the same driving speeds, when it is desired to steer the vehicle in a straight ahead direction, and in which the hydraulic control for steering is rendered ineffective for steering when the drive transmission for the vehicle is disconnected from its source of power.

These and other objects of the invention will appear from time to time as the following specification proceeds and with reference to the accompanying drawings wherein:

FIGURE 2 is a diagrammatic view of the hydraulic steering control circuit; and

FIGURE 3 is a diagrammatic view, diagrammatically illustrating the control connections for steering showing the control in an extreme steering position.

Figure 1:
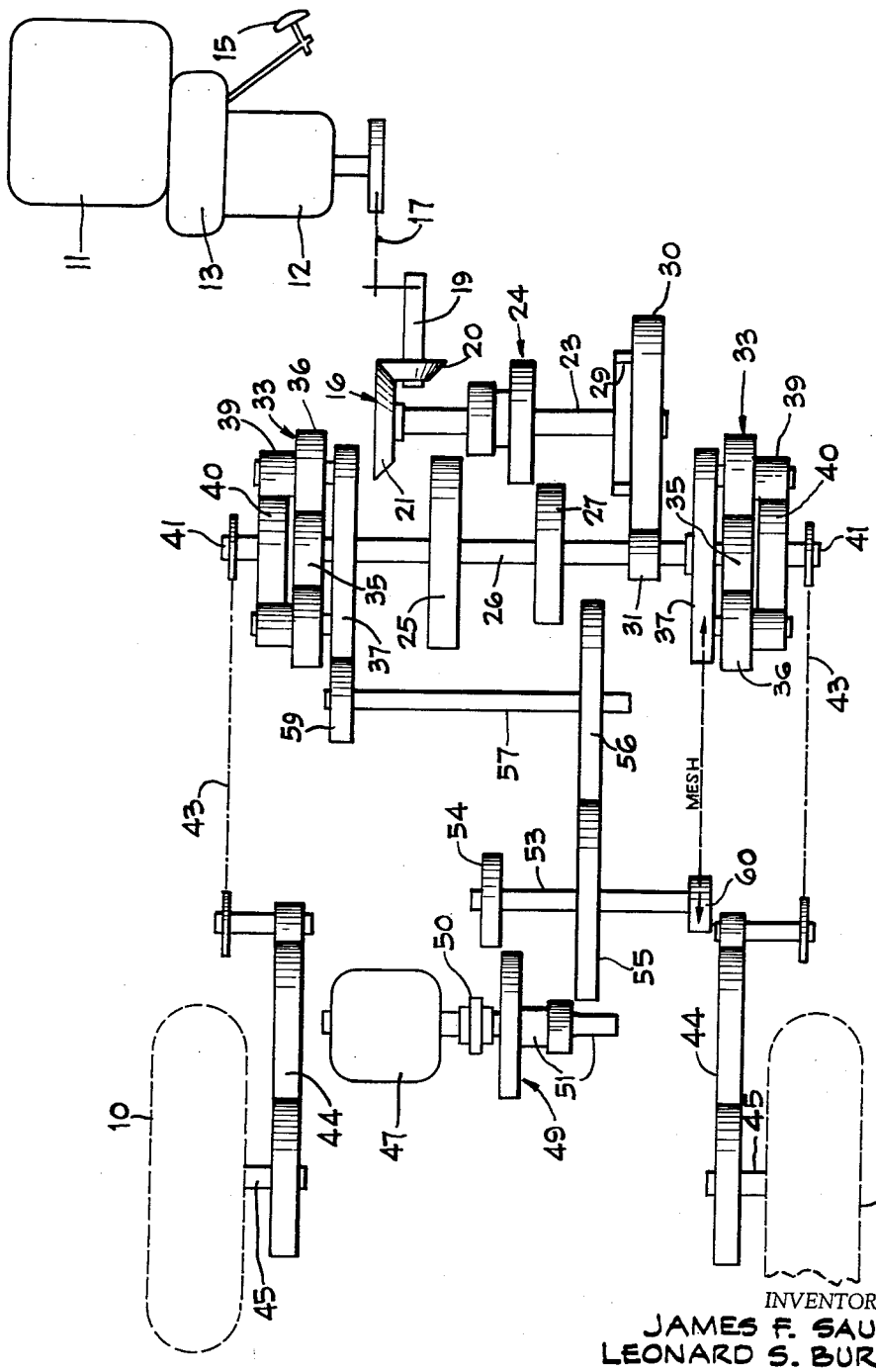
FIGURE 1 is a diagrammatic view illustrating the drive to the traction devices of a vehicle, and the skid steering control therefor.

In the embodiment of the invention illustrated in the drawings, we have shown in FIGURE 1 a pair of laterally spaced traction devices 10, which may be rubber tired wheels or continuous traction tread devices. We have also shown an engine 11, which may be an internal combustion engine of any well known form.

The engine 11 has driving connection with a transmission 12 through a clutch 13 disengaged by a clutch pedal 15 in a conventional manner. The transmission 12 and clutch 13 may be of well known forms and drive a power steering and drive transmission 16 through a chain and sprocket drive 17, driving a main shaft 19 for the power steering and drive transmission 16.

The main drive shaft 19 is shown as having a bevel pinion 20 thereon meshing with and driving a bevel gear 21 on a transverse shaft 23. The transverse shaft 23 has change speed gearing 24 driven thereby and mounted for slidable movement therealong and meshing with a spur gear 25 on a transmission shaft 26, for driving said transmission shaft at a relatively low rate of speed, a gear 27 on the transmission shaft 26 for driving said transmission shaft at a higher rate of speed or with internal teeth 29 extending from one side of a spur gear 30, meshing with a spur gear 31 on the transmission shaft 26, for driving said transmission shaft at a higher rate of speed. A suitable arrangement (not shown) may be provided to shift the change speed gearing 24 along the shaft 23, to effect a drive to the shaft 26 at a selected rate of speed. Said shifting mechanism is no part of the present invention so need not herein be shown or described.

The shaft 26 serves as a drive means for individual epicyclic or variable speed planetary gear trains 33, 33 for each traction device 10. The planetary gear trains 33 are disposed at opposite ends of the shaft 26 and are driven from input sun gears 35, meshing with planetary pinions 36 rotatably carried by reaction members 37, mounted for free rotation with respect to the shaft 26, as shown and described in a companion application Serial No. 847,533, filed by Guy Banister on October 20, 1959, now Patent No. 2,996,933, and assigned to the assignee of the present invention.

Each reaction member 37 also carries planetary pinions 39 coaxial with the planetary pinions 36, and spaced outwardly therefrom and fixed thereto for rotation therewith. The planetary pinions 39 in turn drive output sun gears 40 on output transmission shafts 41. The output transmission shafts 41 in turn drive the wheels 10 through chain and sprocket drives 43, driving reduction gear trains 44 for driving supporting axles 45 for the traction devices 10, as in the aforementioned companion application Serial No. 847,533.

In the present invention, steering is attained like that in the aforementioned companion application Serial No. 847,533, namely by varying the output speeds of the planetary geared reduction devices 33 in a reverse order, that is by increasing the output speed of one planetary geared reduction device and decreasing the output speed of the opposite planetary geared reduction device, the vehicle turning about the traction device driven at decreasing speeds. When it is desired that the vehicle travel in a straight ahead direction, the two planetary geared reduction devices are locked to drive the traction devices on each side of the vehicle at the same output speeds.

The output speeds of the planetary geared reduction devices 33 are varied in reverse order by operation of a reversely rotatable variable speed hydraulic motor 47, driving change speed gearing 49 through a coupling 50. The change speed gearing 49 is axially movable along a drive shaft 51 by operation of suitable shifting mechanism (not shown) to drive a control shaft 53 at a relatively high rate of speed through a spur gear 54 or at a lower rate of speed through a spur gear 55. The spur gear 55 meshes with and drives a spur gear 56 of the same pitch diameter as the spur gear 55 and keyed or otherwise secured to a control shaft 57. A spur pinion 59 on the control shaft 57 has driving engagement with the reaction member 37, for rotatably driving said reaction member in accordance with the direction of rotation of the motor 47, and thereby varying the output speed of the planetary geared reduction device 33, in an obvious manner.

A spur pinion 60 on the shaft 53 of the same pitch diameter as a spur pinion 59, meshes with and drives the associated reaction member 37 at the same rate of speed the spur pinion drives the opposite reaction member 37, but in an opposite direction of rotation, than the direction of rotation of the opposite reaction member 37.

Thus, when the change speed gearing 49 has driving engagement with the spur gear 55, the output speed of one planetary geared reduction device will decrease, while the output speed of the opposite planetary geared reduction device will increase, and effect turning of the vehicle about the traction device driven at the decreasing rate of speed.

When the motor 47 is not in operation it will be locked from rotation, the reverse gear driving the two reaction members 37 will thus lock said reaction members from rotation. The traction devices 10 will then rotate at the same rates of speed and the vehicle will then travel in a straight ahead direction.

As in the aforementioned companion application Serial No. 847,533, the change speed gear train 49 is provided to give a low steering ratio for low speed operation of the paver finisher during maneuvering of the paver finisher to effect the paving operation and during the paving operation, and to give a high steering ratio for high speed operation of the paver finisher during travel of the paver-finisher from working place to working place, it being understood that as the speed of travel of the paver finisher increases, the speeds of the input sun gears 35 will increase relative to the speeds of rotation of the reaction members 37. Thus, for high speed operation of the vehicle, the sensitivity of steering would be materially reduced except for the change speed gearing 49, giving a high speed steering ratio for high speed operation of the vehicle, and compensating for the increase in speeds of the input sun gears 35, as the speed of travel of the vehicle increases.

Referring now in particular to FIGURE 2 and the novel hydraulic control system for the hydraulic steering motor 47, the source of supply of fluid under pressure is shown as comprising a pump 63 which may be directly driven from the internal combustion engine 11, and which is in operation as long as the internal combustion engine is in operation. The pump 63 takes hydraulic fluid such as oil from a storage tank 64 through an intake line 65 having a filter 66 therein.

A pressure line 67 leads from the outlet of the pump to a relief valve 69, which may be loaded to return hydraulic fluid to the tank 64 through a return line 70, upon excessive pressure conditions. A pressure line 71 having a filter 73 leads from the relief valve 69 to a fixed flow regulator valve 74 having connection with a valve 75 through a pressure line 76. The valve 75 may control the supply of fluid under pressure to certain operating parts of the vehicle and is no part of the present invention, so need not herein be shown or described further. A pressure line 77 connects the fixed flow regulator valve 74 with a variable flow regulator valve 79 controlling the flow of fluid under pressure to a four-way control valve 80, under the control of a steering wheel 81.

The variable flow regulator valve 79 may be a Waterman series 1407 pressure compensated full range adjustable flow regulator, arranged to progressively and infinitely vary the amount of hydraulic fluid under pressure delivered to the four-way control valve 80 from zero g.p.m. to the maximum g.p.m. available from the source of supply of fluid under pressure. The valve 79 has a by-pass outlet having a by-pass line 83 leading therefrom back to tank. The by-pass outlet and by-pass line 83 by-pass inlet flow in excess of regulated flow back to the tank 64 at working pressure.

The four-way valve 80 may be a well known commercial form of rotary valve operated by turning movement of the steering wheel 81 to supply fluid under pressure to one side or the other of the hydraulic motor 47, as the steering wheel 81 is turned in one direction or another past a straight ahead position.

When the steering wheel 81 is in a straight ahead position, no fluid will flow to the hydraulic motor 47 and said motor will be locked from rotation. As the steering wheel 81 is turned in one direction from a straight ahead position, fluid under pressure will pass from the inlet port 86 through an outlet port 89 and pressure lines 90 and 91 and a governing valve 92 in the pressure line 90 to the hydraulic motor 47, to effect rotation of said motor in one direction. Return fluid will pass from the motor 47 through a pressure line 93, a pressure line 95 and a governing valve 94 in said pressure line, to a port 96 in the valve 80, and out the port 87 through the return line 88 to tank. As the steering wheel 81 is turned in an opposite direction, the inlet pressure port 86 will be connected with the port 96 to effect the supply of fluid under pressure to the hydraulic motor 47 through the pressure lines 95 and 93 and governing valve 94, to thereby reverse the direction of rotation of the hydraulic motor 47. Fluid will be returned from the hydraulic motor 47 through the line 91 governing valve 92 and pressure line 90, the port 89 of the valve and the outlet port 87 and return line 88.

In FIGURE 3 of the drawings, we have diagrammatically shown an illustrative form of control for the valves 80 and 79, for operating the four-way valve 80 and the variable flow regulator valve 79 to supply fluid under pressure thereto at infinitely variable rates of fluid per minute. As shown in FIGURE 3, the steering wheel 81 has connection with a control shaft 97 through a chain and sprocket drive 98. The control shaft 97 has a lever arm 99 extending therefrom. An upright pin 100 is mounted adjacent the outer end of the lever arm 99, and has slidable engagement with an outwardly opening elongated slot 101, in a control arm 103 for the valve 80. The control arm 103 is mounted on a valve shaft 104, for turning said valve shaft in accordance with turning movement of the steering wheel 81. The control connection from the steering wheel 81 to the valve shaft 104 is such that a very slight movement of the steering wheel from a straight-ahead position will actuate the four-way valve 80 to supply hydraulic fluid to one side or the other of the motor 47, and to change the flow of hydraulic fluid from one side of the motor 47 to the opposite side thereof, to reverse the direction of rotation thereof.

The control shaft 97 also has a cam 105 thereon, engaging a follower 106 on the end of a control arm 107 for the variable flow regulator valve 79. A spring 109 is provided to bias the follower 106 into engagement with the cam 105. When the follower 106 is on the high part of the cam 105, as shown in FIGURE 3, the valve 79 will be in its wide open position to deliver a maximum quantity of hydraulic fluid under pressure to the inlet port 86 of the valve 80.

It may be seen from the foregoing that the direction of turning of the steering wheel 81 determines the direction of the flow of hydraulic fluid under pressure to the hydraulic motor 47 and the direction of rotation of said hydraulic motor 47. The supply and amount of hydraulic fluid under pressure supplied to the valve 80 is also determined by turning movement of the steering wheel 81, and the amount of hydraulic fluid supplied to the hydraulic motor 47 increases as the wheel is turned farther in one direction or another from a straight ahead position.

As has previously been mentioned, when the steering wheel 81 is in a neutral or straight ahead position, the hydraulic motor 47 and the reverse geared drive connection from said hydraulic motor to the two reaction members 37, will lock said reaction members from rotation and the planetary geared reduction devices will drive the right and left traction devices 10 at equal speeds.

As the steering wheel 81 is turned from a straight ahead position to the right or left, the valve 79 will be opened to supply fluid under pressure to the valve 80, and the valve 80 will at the same time be opened to supply fluid under pressure to one side or the other of the hydraulic motor 47 and rotate one reaction member 37 in one direction and the opposite reaction member 37 in an opposite direction, as previously described. This will cause one traction device to move faster than it was formerly moving and the other traction device to move slower than it was formerly moving. The vehicle will then turn about the slower moving traction device, the radius of curvature being determined by the speed of the hydraulic motor 47 as controlled by the flow regulator valve 79.

A float or by-pass valve 111 is shown as being connected between the pressure lines 90 and 95. The valve 111 may be of a well known form of commercial valve, and as herein shown, has a valve spool 112 operated by operation of the clutch pedal 15. When the clutch is engaged, the spool 112 will be in its innermost position. Fluid under pressure will then flow from the pressure line 90 to the pressure line 91 through the hydraulic motor 47 and through the lines 93 and 95 back to tank, when the steering wheel is turned in one direction, and vice versa when the steering wheel is turned in an opposite direction. As, however, the clutch pedal 15 is depressed, to disengage the clutch 13, a link 113 connected between the clutch pedal 15 and the valve spool 112, will move the valve 111 into an open position and fluid will be by-passed from the pressure line 90 to the pressure line 95 and returned to tank through the return line 88, and vice versa, upon reversal in the direction of turning movement of the steering wheel 81.

When the clutch 13 is disengaged and the drive to the transmission 16 is disconnected from the engine, the pump 69 will still be in operation, but the valve 111 will short circuit the flow of hydraulic fluid past the hydraulic motor 47 and stop the steering action. The hydraulic motor 47 will then free wheel. With the drive to the transmission disengaged and continued momentum of the chassis, however, the planetary geared reduction devices 33, will act as a true differential. The chassis can then be steered by braking one or the other gear trains by operation of the usual brakes (not shown).

The governing valves 92 and 94 may be commercial valves of well known forms and are commonly referred to as counterbalance valves. Said valves may be Waterman 666–4 counterbalance valves and accommodate the free flow of hydraulic fluid in a pressure direction, but are held open by pilot pressure from the pressure line upon the reverse flow of fluid. Said valves are provided to assure that the steering motor 47, will rotate at the desired rate of speed, and to prevent the steering motor 47 from running away where the vehicle may be operating on a slippery pavement and the traction devices on one side of the vehicle may slip and run ahead of themselves, with the result that the opposite traction devices will tend to drive through the planetaries.

The valve 92 is connected with the pressure line 95 through a pilot line 115, which holds the valve 92 to open to return fluid therethrough to the tank 64 during normal operation of the motor 47 in one direction. In a similar manner, the valve 94 is connected with the pressure line 91 through a pilot line 116 which holds the valve 94 open to return fluid therethrough to the tank 64 during normal operation of the motor 47 in an opposite direction.

When the four-way valve 80 is in position to supply fluid under pressure to the steering motor 47 through the pressure lines 90 and 91, the valve 92 will open by the pressure of fluid passing therethrough and the motor 47 will rotate in one direction. Fluid under pressure will also pass through the pilot line 116 and hold the valve 94 open, to accommodate the return of fluid to tank through the valve 94 and lines 93 and 95.

When, however, there may be a pressure drop, as where the traction devices on one side of the vehicle may tend to slip, the pressure in the pilot line 116, will drop and the valve 94 will tend to close and build up back pressure on the motor 47. The motor will then operate against pressure in the return line and operate in the nature of a pump.

The governing valves 92 and 94, therefore, keep the motor 47 from overrunning and assure that the motor operate at a controlled speed, selected by the operator under control of the steering wheel 81.

When it is desired to effect a center of gravity turn, the steering transmission 16 may be put in the neutral position diagrammatically shown in FIGURE 1. With the master clutch engaged, the valve 111 will be closed. Upon turning of the steering wheel, in the direction of turn desired, the hydraulic motor 47 will drive one reaction member 37 in one direction and the opposite reaction member 37 in an opposite direction rotating the planetary pinions 36 about the stationary sun gears 35 and driving the output sun gears 40 in opposite directions through the planetary pinions 39. The traction devices 10 will then be positively driven in opposite directions, and the rate of turn will be a function of the steering wheel turning range.

While we have herein shown and described one form in which our invention may be embodied, it should be understood that various modifications and variations in the invention may be attained without departing from the spirit and scope of the novel concepts thereof, as defined by the claims appended hereto.

We claim as our invention:

1. In a skid steer hydraulic power steering system, a pair of laterally spaced traction devices, two variable speed reduction devices, a common engine for driving each of said variable speed reduction devices, each variable speed reduction device having driving connection with one traction device, a source of fluid under pressure, a reversely operable variable speed hydraulic motor, geared drive connections from said hydraulic motor to said variable speed reduction devices, one of said drive connections including reverse gearing for varying the speeds of said variable speed reduction devices in a reverse order, means for locking said geared drive connections from rotation to effect drives through said variable speed reduction devices at the same rates of speed, a control member, a control valve, an operative connection between said control member and valve for operating said valve, a pressure line connecting said valve with said source of fluid under pressure, a second pressure line connecting said valve with said hydraulic motor, and a variable flow regulator valve in said first mentioned pressure line and having operative connection with said control member and operated thereby and supplying fluid under pressure to said control valve at increasing rates of flow as said control member is moved past a straight ahead position.

2. In a skid steering hydraulic power steering system, a pair of laterally spaced traction devices, two variable speed reduction devices, each having drive connection with one of said traction devices, a common engine for driving both of said variable speed reduction devices, a source of fluid under pressure, a reversely operable variable speed hydraulic steering motor, geared drive connections from said hydraulic motor to said variable speed reduction devices, one of said drive connections including idler gearing for varying the speeds of said variable speed reduction devices in a reverse order, means for effecting drives through said variable speed reduction devices at the same rates of speed, a control member, a four-way valve, a fluid connection from said source of fluid under pressure to said four-way valve, fluid connections from said four-way valve to said hydraulic motor, a variable flow regulator valve in said first mentioned fluid connection controlling the supply of fluid under pressure to said four-way valve, operative connections from said control member to said four-way valve and said variable flow regulator valve to effect rotation of said motor in one direction or another dependent upon the direction of turning of said control member from a straight ahead position, and to increase the supply of fluid under pressure to said motor upon further turning movement of said control member from a straight ahead position.

3. In a skid steer hydraulic power steering system, a pair of laterally spaced traction devices, two variable speed reduction devices, each having driving association with one of said traction devices, a common engine for simultaneously driving said variable speed reduction devices, a source of fluid under pressure, a reversely operable variable speed hydraulic steering motor, geared drive connections from said hydraulic steering motor to said variable speed reduction devices for varying the speeds of said variable speed reduction devices in a reverse order and for effecting drives through said variable speed reduction devices at the same rates of speed, a control member, a four-way valve, a fluid connection from said source of hydraulic fluid under pressure to said four-way valve, fluid connections from said four-way valve to said hydraulic motor, a variable flow regulator valve in said first mentioned fluid connection controlling the supply of fluid under pressure to said four-way valve, operative connections from said control member to said four-way valve and said variable flow regulator valve to effect rotation of said hydraulic motor in one direction or another dependent upon the direction of turning of said control member from a straight ahead position, and to increase the supply of fluid under pressure to said hydraulic motor upon further turning movement of said control member from a straight ahead position, and governing valve means in said fluid connections from said four-way valve to said hydraulic motor operated by a pressure drop on the supply side of said hydraulic motor for building up a back pressure on said hydraulic motor and holding said hydraulic motor from operation above a selected speed.

4. In a skid steer hydraulic power steering system, a pair of laterally spaced traction devices, two variable speed reduction devices, an engine for driving both of said variable speed reduction devices, a reversely operable variable speed hydraulic steering motor, geared drive connections from said hydraulic steering motor to said variable speed reduction devices, one of said geared drive connections including idler gearing for reversing the directions of the drives to said variable speed reduction devices, said hydraulic motor also locking said geared drive connections from rotation to effect drives through said variable speed reduction devices at the same rates of speed, a control member, a four-way valve, a pressure line connected from said source of supply of fluid under pressure to said four-way valve, pressure lines connecting said four-way valve with opposite sides of said hydraulic motor, a variable flow regulator valve in said first mentioned pressure line controlling the supply of fluid under pressure to said four-way valve, operative connections from said control member to said four-way valve and said variable flow regulator valve, to supply fluid under pressure to either of said second mentioned pressure lines at increasing volumes as said control member is turned in one direction or another past a straight ahead position, a speed governing valve in each of said second mentioned pressure lines, accommodating the free flow of hydraulic fluid to operate said hydraulic motor in either direction, and control lines connected from said second mentioned pressure lines to said speed governing valves in the opposite of said second mentioned pressure lines, and supplying fluid to hold said speed governing valves open for the return of fluid therethrough and accommodating the valve in the return line to be moved toward a closed position upon a pressure drop in the pressure line supplying fluid under pressure to said hydraulic motor, and building up a back pressure on said motor.

5. In a hydraulic power skid steering system for vehicles having traction devices, a transmission, a drive connection between said transmission and said traction devices, an engine, clutch means connecting said engine with said transmission, a clutch operator for disengaging said clutch means, a control member, a reversible variable speed hydraulic steering motor having controlling connection with said drive connection and effecting steering in one direction or another dependent upon the direction of rotation of said hydraulic steering motor, a control valve operated by said control member, fluid pressure lines from said control valve to opposite sides of said hydraulic motor for operating said hydraulic motor in one direction or another in accordance with the direction of turning movement of said control member from a straight ahead position; a tank, a pump, a pressure line leading from said pump to said control valve, a variable flow regulator valve in said pressure line, an operative connection from said control member to said variable flow regulator valve for operating said variable flow regulator valve by turning movement of said control member past a straight ahead position in either direction, and increasing the flow of hydraulic fluid to said control valve the farther said control member is turned from a straight ahead position, a by-pass valve connected across said first mentioned fluid pressure lines, and an operative connection from said clutch operator to said by-pass valve for actuating said by-pass valve upon operation of said clutch operator to disengage said clutch, to by-pass fluid under pressure past said hydraulic motor and stop the steering action thereof.

6. In a hydraulic power steering system for vehicles having traction devices, a transmission having independent drive connections with said traction devices, an engine, a drive connection from said engine to said transmission including a clutch, a reversible hydraulic steering motor controlling the drive connections from said transmission to said traction devices and effecting steering in one direction or another dependent upon the direction of rotation of said hydraulic steering motor, a supply tank, a pump connected with said tank, a control valve, a fluid connection from said pump to said control valve, fluid connections from said control valve to opposite sides of said hydraulic motor operative to supply fluid under pressure to either side of said hydraulic motor dependent upon the position of said control valve, a variable flow regulator valve in said first mentioned fluid connection from said pump to said control valve, controlling the volume of hydraulic fluid under pressure supplied to said control valve, a control member, operative connections from said control member to said control valve and said variable pressure regulator valve for simultaneously operating said valves, to supply fluid under pressure to one side or the other of said hydraulic motor and to increase the supply of fluid under pressure to said hydraulic motor as said control member is turned past a straight ahead position, a by-pass valve connected across said second mentioned fluid connections between said control valve and said hydraulic motor, a clutch operating member, and an operative connection from said clutch operating member to said by-pass valve, to operate said by-pass valve to short circuit hydraulic fluid from said hydraulic motor and stop the steering action of said hydraulic motor as said operating member for said clutch is moved in a direction to disconnect said engine from said transmission.

7. In a hydraulic power steering system, a pair of laterally spaced traction devices, a separate variable speed transmission device for driving each traction device, an engine having a common driving connection with said transmission devices, means for varying the output speeds of said transmission devices in a reverse order to increase the speed of one traction device and decrease the speed of the other traction device comprising a reversible hydraulic motor, reversely operable controlling connections driven by said hydraulic motor and having controlling connection with said transmission devices for varying the output speeds thereof, a control member, a pump, a pressure line leading from said pump, valve means connected with said pressure line, two pressure lines connected from said valve means to opposite sides of said hydraulic motor, an operative connection from said control member to said valve means for operating said valve means upon movement of said control member past a straight ahead position in one direction or another for supplying fluid under pressure to either one of said last mentioned pressure lines and one side or the other of said hydraulic motor dependent upon the direction of rotation of said control member, a variable flow regulator valve in said first mentioned pressure line, an operative connection from said control member to said variable flow regulator valve and operating said flow regulator valve simultaneously with operation of said valve means by turning movement of said control member past a straight ahead position in one direction or another to increase the volume of hydraulic fluid under pressure supplied to said valve means as turning movement of said control member beyond a straight ahead position is continued.

8. A hydraulic power skid steering system in accordance with claim 7, wherein the common drive to said transmission devices includes a clutch and an operating member therefor operable to disconnect said transmission devices from said engine, and means automatically operable to stop steering upon disengagement of said clutch comprising a by-pass valve normally closed and a linkage connection from said clutch operating member to said by-pass valve, to operate said by-pass valve to short circuit hydraulic fluid past said hydraulic motor and to allow said motor to free wheel, as said clutch operating member is operated to disengage said clutch.

9. In a hydraulic power steering system for vehicles having traction devices, an engine, a transmission having independent drive connection with said traction devices, a clutch for connecting said engine with said transmission, a control member, a reversible variable speed hydraulic steering motor for controlling the individual drive connections from said transmission to said traction devices and thereby effecting steering of the vehicle, a four-way valve, pressure lines connecting said four-way valve with said hydraulic motor for supplying fluid under pressure to either side of said hydraulic motor under the control of said four-way valve, an operative connection between said control member and said four-way valve for opening said four-way valve upon turning movement of said control member past a straight ahead position, a source of supply of hydraulic fluid under pressure comprising a tank, a pump, a pressure line connecting said pump with said four-way valve, a variable flow regulator valve in said pressure line, an operative connection from said control member to said variable flow regulator valve for operating said flow regulator valve simultaneously with said four-way valve, to increase the volume of hydraulic fluid supplied to said four-way valve as said control member is turned past a straight ahead position, to vary the speed of rotation of said hydraulic motor and thereby vary the radius of turn of steering.

10. In a hydraulic power steering system for vehicles having traction devices, an engine, a transmission having independent drive connection with said traction devices, a clutch for connecting said engine with said transmission, an operator for said clutch, a control member, a reversible variable speed hydraulic steering motor for controlling the individual drive connections from said transmission to said traction devices and thereby effecting steering of the vehicle, a four-way valve, pressure lines connecting said four-way valve with said hydraulic motor for supplying fluid under pressure to either side of said hydraulic motor under the control of said four-way valve, an operative connection between said control member and said four-way valve for opening said four-way valve upon turning movement of said control member past a straight ahead position, a source of supply of hydraulic fluid under pressure comprising a tank, a pump, a pressure line connecting said pump with said four-way valve, a variable flow regulator valve in said last mentioned pressure line, an operative connection from said control member to said variable flow regulator valve for operating said flow regulator valve simultaneously with said four-way valve to increase the volume of hydraulic fluid supplied to said four-way valve as said control member is turned past a straight ahead position, to vary the speed of rotation of said hydraulic motor and thereby vary the radius of turn of steering, and a by-pass valve connected across said pressure lines supplying fluid under pressure to said motor, said by-pass valve normally being in a closed position, and an operative connection from said operator for said clutch to said by-pass valve for opening said by-pass valve to short circuit the supply of fluid under pressure to said hydraulic motor and thereby discontinue steering upon operation of said clutch operator to disengage said clutch and disconnect said transmission from said engine.

11. A skid steer hydraulic power steering system in accordance with claim 10, wherein governing valve means are provided on each side of said reversible variable speed hydraulic steering motor in the pressure lines from said four-way valve to said hydraulic steering motor, and the valve in the pressure line on the return side of said hydraulic steering motor is operated by the pressure drop in the pressure line on the pressure side of said hydraulic steering motor for building up a back pressure on said hydraulic steering motor and thereby controlling rotation thereof.

References Cited in the file of this patent

UNITED STATES PATENTS

| | | |
|---|---|---|
| 2,004,929 | Centervall | June 18, 1935 |
| 2,336,911 | Zimmerman | Dec. 14, 1943 |
| 2,393,557 | Orshansky | Jan. 22, 1946 |
| 2,950,634 | Clark et al. | Aug. 30, 1960 |